United States Patent
Shantanu et al.

(10) Patent No.: US 12,530,302 B2
(45) Date of Patent: Jan. 20, 2026

(54) SYSTEM AND METHOD FOR SOFTWARE-BASED ENHANCEMENTS OF ARM64 PROCESSORS

(71) Applicant: Microsoft Technology Licensing, LLC, Redmond, WA (US)

(72) Inventors: Aditya Shantanu, Bothell, WA (US); KS Huang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/522,417

(22) Filed: Nov. 29, 2023

(65) Prior Publication Data

US 2025/0173270 A1    May 29, 2025

(51) Int. Cl.
G06F 12/08    (2016.01)
G06F 9/38    (2018.01)
G06F 12/0862    (2016.01)

(52) U.S. Cl.
CPC ........ G06F 12/0862 (2013.01); G06F 9/3804 (2013.01); G06F 2212/6028 (2013.01)

(58) Field of Classification Search
CPC .............. G06F 12/0862; G06F 9/3804; G06F 2212/6028
See application file for complete search history.

(56) References Cited

U.S. PATENT DOCUMENTS

| | | | |
|---|---|---|---|
| 8,868,845 B1 | 10/2014 | Harvey | |
| 8,935,781 B1* | 1/2015 | Muth | G06F 21/74 726/22 |
| 10,810,784 B1 | 10/2020 | Rai | |
| 2003/0131168 A1* | 7/2003 | Kauffman | G06F 13/36 710/244 |
| 2003/0191916 A1* | 10/2003 | McBrearty | G06F 11/1464 711/112 |
| 2009/0248984 A1* | 10/2009 | Shen | G06F 12/0884 711/E12.024 |
| 2010/0131937 A1 | 5/2010 | Misra | |

OTHER PUBLICATIONS

International Search Report and Written Opinion received for PCT Application No. PCT/US2024/052297, Jan. 31, 2025, 16 pages.
Liu, et al., "No barrier in the road a comprehensive study and optimization of arm barriers", proceedings of the 29th ACM international conference on information & knowledge management, Feb. 19, 2020, pp. 348-361.
René Chevance, "Server Architectures 1-15 Multiprocessors clusters parallel systems, web servers, storage solutions", Elsevier, Jan. 1, 2005, pp. 1-783.

* cited by examiner

Primary Examiner — Jae U Yu (57) ABSTRACT

A method, computer program product, and computing system for processing a first request to access data using an ARM64 processor. A first level cache data portion is defined by calculating a portion of the data to retrieve to a first level cache within a cache memory system. A second level cache data portion is defined by calculating a portion of data to retrieve to a second level cache within the cache memory system. The ARM64 processor is instructed to retrieve the second level cache data portion before retrieving the first level cache data portion. The ARM64 processor is instructed to retrieve the first level cache data portion.

20 Claims, 8 Drawing Sheets

SYSTEM AND METHOD FOR SOFTWARE-BASED ENHANCEMENTS OF ARM64 PROCESSORS

BACKGROUND

Different processor architectures provide different capabilities and constraints. For example, two of the more popular processor architectures are AMD64/"x86-64"/"Intel 64" and ARM64. AMD64 refers to a 64-bit processor architecture used by AMD® and Intel® and is widely used in desktop machines, servers, and cloud storage systems. AMD64 processors have broad software support but involve higher power consumption in many scenarios. ARM64 refers to an Advanced Reduced Instruction Set Computing (RISC) Machine architecture that is developed by ARM Holdings and is prevalent in mobile devices and is increasingly used in servers. The "64" in ARM64 refers to the architecture's 64-bit processing capability. ARM64 processors known for energy efficiency but have limited software compatibility. As software developers seek to bridge the gap between AMD64 processors and ARM64 processors, many performance-based issues prevent software applications from operating consistently across both architectures.

BRIEF DESCRIPTION OF THE DRAWINGS

Like reference symbols in the various drawings indicate like elements.

DETAILED DESCRIPTION OF THE EMBODIMENTS

Implementations of the present disclosure provide software-based enhancements to ARM64 processors to allow ARM64 processors to perform similarly to AMD64 processors. For example, when retrieving large amounts of data to a cache memory system using an AMD64 processor, the AMD64 processor is able to process data using the Level 1 cache, refill data to the Level 1 cache, and to potentially refill to the Level 2 cache when needed. When using an ARM64 processor, the ARM64 processor is generally unable to perform at the same level as the AMD64. However, the ARM64 processor does not coordinate the retrieving of data across both cache levels. Accordingly, this challenge within the ARM64 processor results in performance degradation for any software application using the ARM64 processor to process larger portions of data using a cache memory system.

Additionally, when addressing conditional branches in the execution of a request, ARM64 processors experience higher branch prediction miss rates compared to AMD64 processors. For example, when processing the candidate branches during each iteration or "loop" of the request, ARM64 processors have reduced performance characteristics for predicting the likely candidate branch compared to AMD64 processors resulting in performance degradation for software applications using the ARM64 processor to process candidate branches in the execution of requests. Implementations of the present disclosure use the registers of the ARM64 processor to process all candidate branches at compile time to reduce branch prediction misses. In this manner, as opposed to attempting to predict which branch will be selected during execution and processing the predicted candidate branch code, the present disclosure uses pre-processed candidate branch code as a template that is selected during execution.

In another example, locking mechanisms (e.g., spinlocks) within the ARM64 processor architecture typically use an optimistic acquiring mechanism that locks a certain amount of data (e.g., eight bytes). A cache line in ARM64 is typically a larger amount of data (e.g., sixty-four bytes) than the spinlock allows. However, when a spinlock locks a subset of a cache line (e.g., a particular eight-byte portion of a sixty-four-byte cache line), a request to access the other non-locked portions of data (i.e., data not subject to spinlock) fails the spinlock operation. Accordingly, request processing suffers from significant performance degradation when failing a spinlock operation and resolving the request for non-locked portions of data. Implementations of the present disclosure allow for software-defined spinlock sizing that matches the size of the spinlock to that of the ARM64 cache line. In this manner, spinlock failures are reduced as an entire cache line of data is subject to locking such that requests for locked data are processed after the spinlock is released without interrupting the spinlock.

Additionally, when processing requests for data subject to a lock (e.g., within a spinlock), conventional approaches to pausing or delaying the requests are limited to continuous and performance degrading spinlock status checking. For example, suppose a portion of data is locked using a spinlock for processing a first request. A second request for the same portion of data is paused until the spinlock is released. However, with the ARM64 architecture, the ARM64 processor will continuously poll for the spinlock status. While all processor architectures suffer from this issue when a processor keeps polling, the AMD64 architecture in general has a simultaneous multithreading (SMT) design, which allows yielding execution unit to other execution pipelines, while the processor is waiting for the spinlock to be released. ARM64 does not have SMT design, so implementations of the present disclosure provide an effective way to instruct the processor to backoff from a memory bus. As this approach effectively wastes limited processing resources, the performance of the ARM64 processor is reduced. Implementations of the present disclosure provide specific delay instructions that reduce the polling of a spinlock status and provide for iterative backing off to further limit processing resources or cycles from being wasted.

As will be described in greater detail below, implementations of the present disclosure process a first request to access data using an ARM64 processor. A first level cache data portion is defined by calculating a portion of the data to retrieve to a first level cache within a cache memory system. A second level cache data portion is defined by calculating a portion of data to retrieve to a second level cache within the cache memory system. The ARM64 processor is instructed to retrieve the second level cache data portion before retrieving the first level cache data portion and is instructed to retrieve the first level cache data portion.

Accordingly, implementations of the present disclosure provide software-based enhancements to the limitations in ARM64 processors to provide comparable performance as AMD64 processors. Specifically, by providing instructions to direct the ARM64 processor when processing requests for software applications, ARM64 processor performance is improved, and software application performance is consistent across ARM64 and AMD64 processor architectures.

The details of one or more implementations are set forth in the accompanying drawings and the description below. Other features and advantages will become apparent from the description, the drawings, and the claims.

The ARM64 Enhancement Process:

Referring to FIGS. 1-7, enhancement process 10 processes 100 a first request to access data using an ARM64 processor. A first level cache data portion is defined 102 by calculating a portion of the data to retrieve to a first level cache within a cache memory system. A second level cache data portion is defined 104 by calculating a portion of data to retrieve to a second level cache within the cache memory system. The ARM64 processor is instructed 106 to retrieve the second level cache data portion before retrieving the first level cache data portion. The ARM64 processor is instructed 108 to retrieve the first level cache data portion.

When fetching large amounts of data to a cache memory system using an AMD64 processor, the AMD64 processor is generally able to process data using the Level 1 cache. When using an ARM64 processor, however, the ARM64 processor is generally unable to perform at the same level as the AMD64 which requires using the Level 2 cache. For example, the ARM64 processor does not naturally coordinate the retrieving of data across multiple cache levels. For ARM64, accessing data generally involves bringing the data into the Level 1 cache. When data is not in the Level 1 cache, the ARM64 processor looks for the data from the Level 2 cache, and if not in the Level 2 cache, the ARM64 processor looks for the data in other cache levels and in main memory. When accessing large and/or random portions of data, processor architectures commonly utilize prefetching to guide the processor on what to prefetch next.

The AMD64 architecture generally decides which cache level to prefetch data to prevent causing too much pressure to a very limited Level 1 cache size. By contrast, ARM64 is unable to automatically determine which cache level to prefetch data to. Accordingly, this challenge within the ARM64 processor results in performance degradation for any software application using the ARM64 processor to process larger portions of data using a cache memory system. In some implementations of the present disclosure, enhancement process 10 provides software application-based instructions to the ARM64 processor to retrieve data to both the Level 1 and Level 2 caches that accounts for the performance distinctions between each cache level. Specifically, enhancement process 10 provides instructions to the ARM64 processor to retrieve data to the Level 2 cache before and during retrieving of data to the Level 1 cache to account for the performance differences between the Level 1 cache and the Level 2 cache (i.e., Level 1 cache performance is significantly greater than Level 2 cache performance). Enhancement process 10 prefetches data to the Level 2 cache in order to balance the load or "pressure" on the Level 1 cache.

Figure 1:
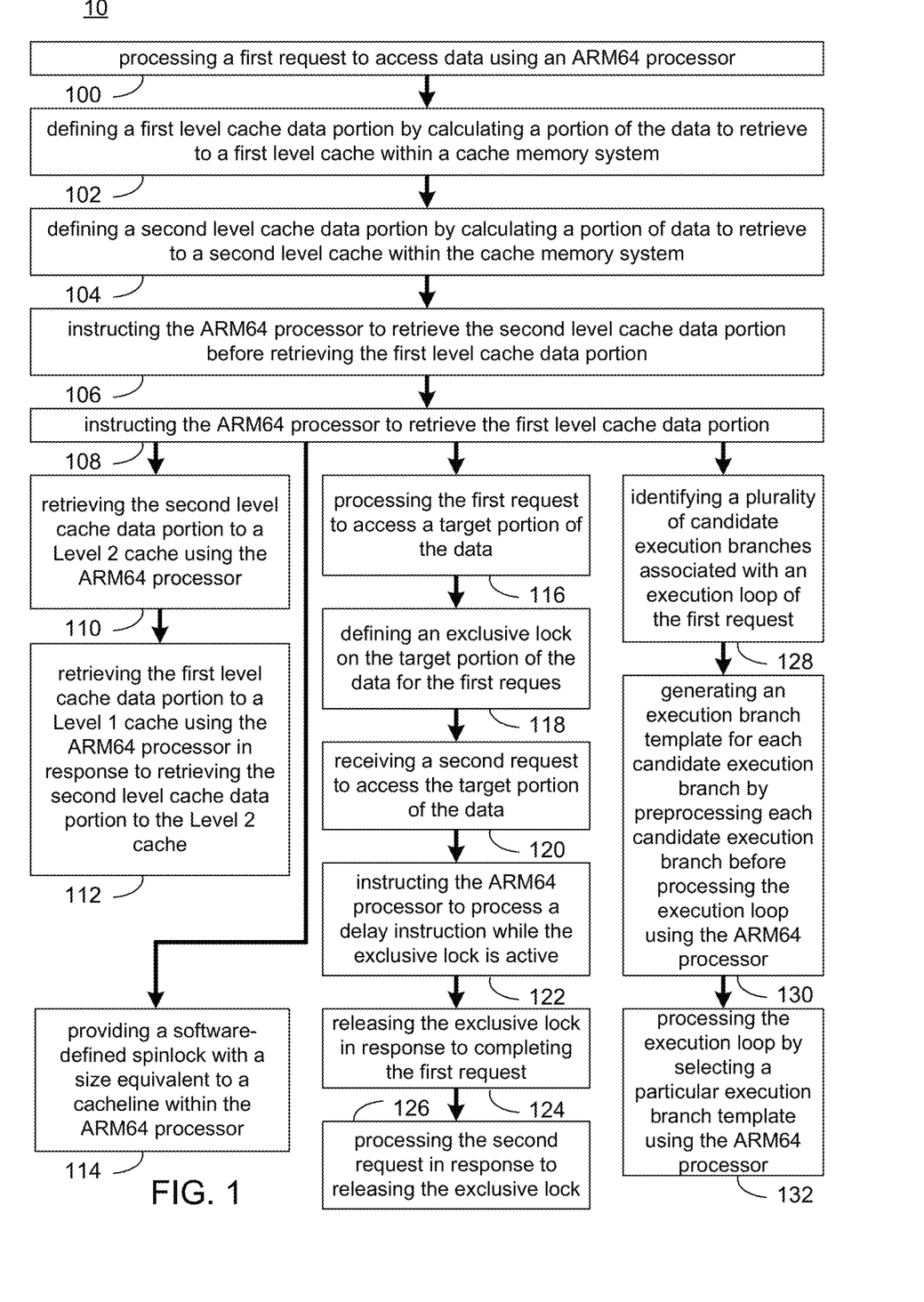
FIG. 1 is a flow chart of one implementation of an enhancement process.
Figure 2:
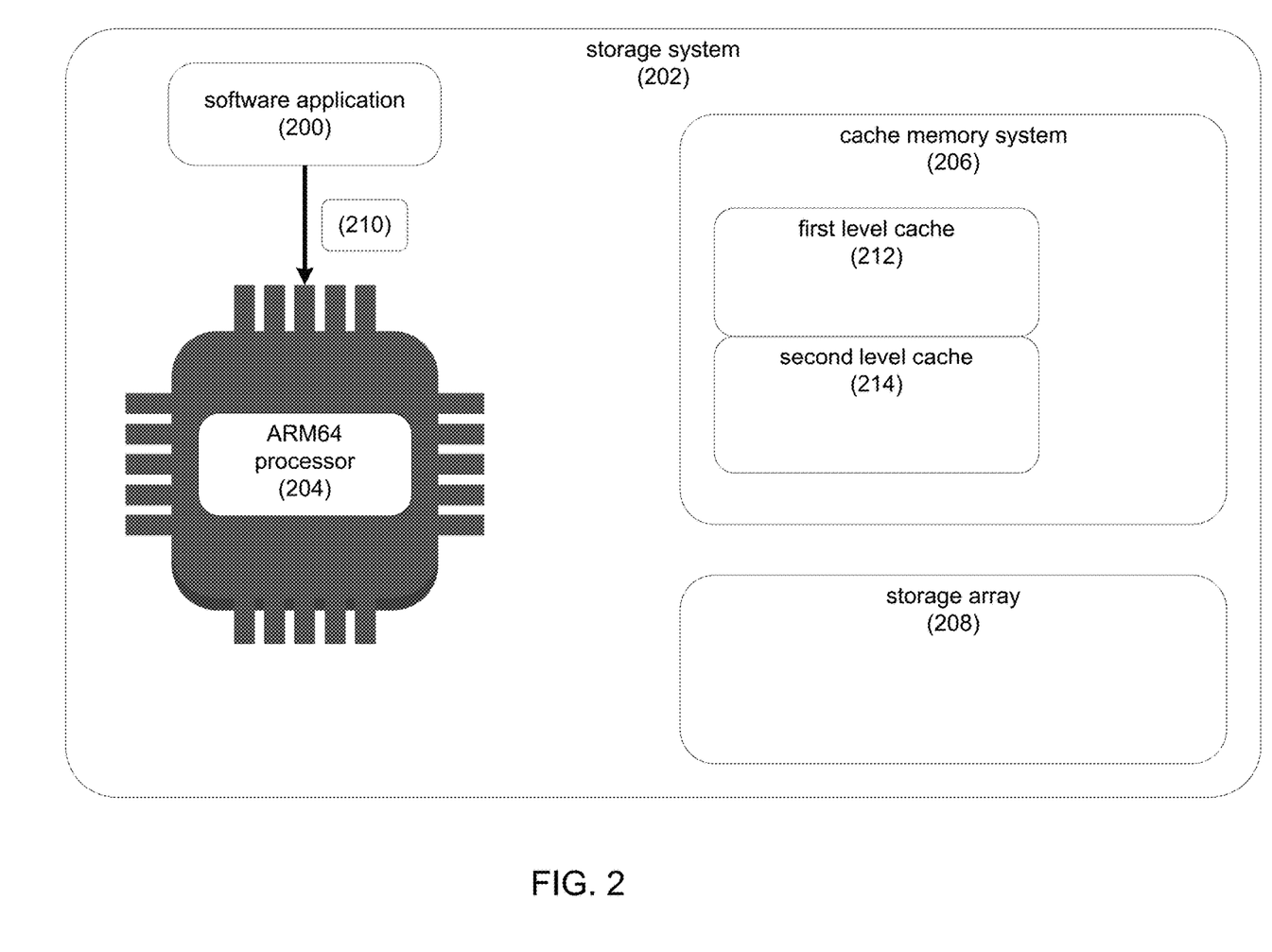
FIG. 2 is a diagrammatic view of a storage system according to one implementation of the enhancement process.

In some implementations, enhancement process 10 processes 100 a first request to access data using an ARM64 processor. Referring also to FIG. 2, suppose a software application (e.g., software application 200) is interacting with a storage system (e.g., storage system 202) that includes an ARM64 processor (e.g., ARM64 processor 204), a cache memory system (e.g., cache memory system 206), and a storage array (e.g., storage array 208). In one example, storage system 202 is a cloud-based storage system that provides data storage in which data is stored on servers in various, off-suite locations. The servers are maintained by a provider who is responsible for hosting, managing, and securing data stored on its infrastructure. In one example, each cloud-based storage system includes various computing devices that access cloud-based storage resources to store and retrieve data within the cloud-based storage system. Cloud-based storage resources includes hard disk (HD) storage capacity, solid-state disk (SSD) storage capacity, and/or virtual storage devices.

In some implementations, software application 200 provides various data access requests (e.g., access request 210). Examples of access request 210 include a data write request (e.g., a request that content be written to storage system 202) and a data read request (i.e., a request that content be read from storage system 202). During operation of storage system 202, content to be written to storage system 202 is processed by ARM64 processor 204. As discussed above, ARM64 is an Advanced Reduced Instruction Set Computing (RISC) Machine (ARM) architecture that is developed by ARM Holdings and is prevalent in mobile devices and is increasingly used in servers. The "64" in ARM64 refers to the architecture's 64-bit processing capability. As will be discussed in greater detail below, ARM64 differs from AMD64 by allowing greater control and configuration of the processing capability of ARM64 processor 204 compared to AMD64 processors. For example, AMD64 includes many automated processing approaches that assist software applications to enhance their performance. While the physical hardware of ARM64 is similarly capable, ARM64 is not as "intuitive" to initiate similar automated processing approaches. Accordingly, enhancement process 10 provides approaches for instructing ARM64 processor 204 to provide similar functionality for software application 200 relative to AMD64 processors. In this manner, enhancement process 10 normalizes any distinctions in the operation of software application 200 on ARM64 processor 204 and an AMD64 processor.

Storage system 202 includes a cache memory system (e.g., cache memory system 206). Examples of cache memory system 206 include a volatile, solid-state, cache memory system (e.g., a dynamic RAM cache memory system) and/or a non-volatile, solid-state, cache memory system (e.g., a flash-based, cache memory system). Storage system 202 initially stores newly written data within cache memory system 206. Depending upon the manner in which cache memory system 206 is configured, ARM64 processor 204 may immediately write content to storage array 208 (if cache memory system 206 is configured as a write-through cache) or may subsequently write content to storage array 208 (if cache memory system 206 is configured as a write-back cache). In one example, cache memory system 206 is a separate hardware component(s) from ARM64 processor 204. In another example, cache memory system 206 is a portion of ARM64 processor 204.

As will be discussed in greater detail below, cache memory system 206 includes multiple cache levels with different performance metrics. For example, a first level cache or Level 1 cache (e.g., first level cache 212) is the highest performance tier of cache memory system 206 with limited capacity but a high-speed memory. A second level cache or Level 2 cache (e.g., second level cache 214) is a lower performance tier of cache memory system 206 with more storage capacity than first level cache 212 but with a lower speed memory.

Referring again to FIG. 2, suppose software application 200 is an instance of a structured query language (SQL) application that provides relational database management functionality. In this example, software application 200 is communicating with storage system 202 to provide cloud-based SQL functionality. Suppose software application 200 provides a request (e.g., first request 210) to access data within storage system 202. Specifically, suppose that request 210 includes a command to copy data from one portion of storage array 208 to another portion of storage array 208. In this example, request 210 describes the source address for the data to be copied and the destination address for copying the data to.

Figure 3:
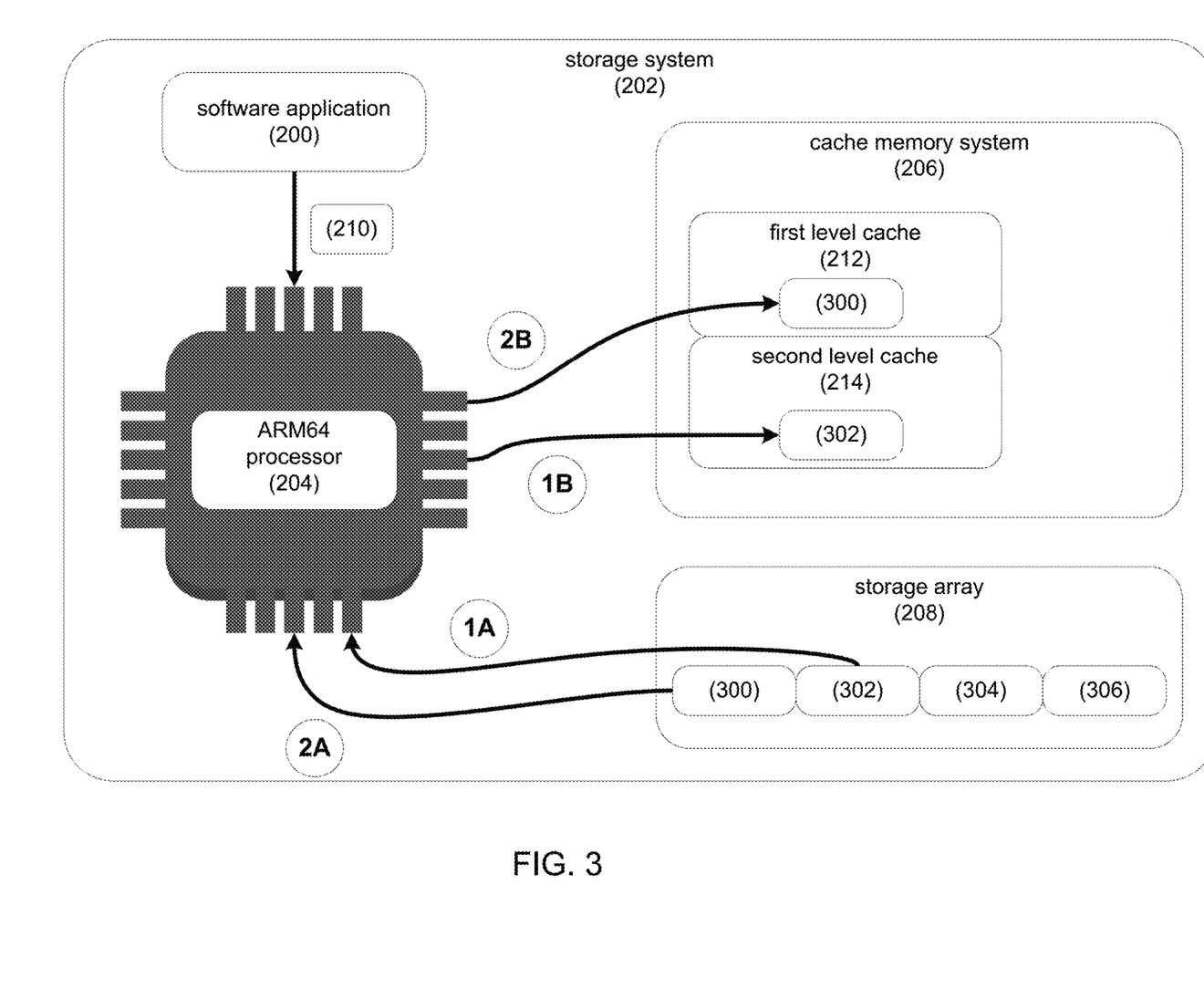
FIG. 3 is a diagrammatic view of the enhancement process prefetching data to multiple cache levels.

In some implementations, enhancement process 10 defines 102 a first level cache data portion by calculating a portion of the data to retrieve to a first level cache within a cache memory system. Referring also to FIG. 3, when processing request 210, ARM64 processor 204 would ideally retrieve all of the data referenced in request 210 to first level cache 212 and then copy the contents to another portion of storage array 208. However, other cache levels are used for large data access requests (e.g., copying a large amount of data). Accordingly, enhancement process 10 defines 210 an amount of data to retrieve to first level cache 212 (e.g., first level cache data portion 300) by calculating a portion of the data to retrieve to a first level cache within a cache memory system. In one example, enhancement process 10 defines 102 first level cache data portion 300 to be the maximum amount of data that can be stored in first level cache 212. In another example, enhancement process 10 defines 102 first level cache data portion 300 to be a predefined amount of data.

In some implementations, enhancement process 10 defines 104 a second level cache data portion by calculating a portion of data to retrieve to a second level cache within the cache memory system. For example, as first level cache data portion 300 is processed by ARM64, additional data portions from storage array 208 are copied to cache memory system 206. However, because of the limited capacity of first level cache 212, enhancement process 10 defines 104 a second level cache data portion (e.g., second level cache data portion 302) by calculating a portion of the data to retrieve to second level cache 214 within cache memory system 206. In one example, enhancement process 10 defines 104 second level cache data portion 302 as the next portions of data to be copied for request 210 after first level cache data portion 300. For example, suppose first level cache data portion 300 includes thirty-two bytes (e.g., bytes numbered "0" to "31") of a total of sixty-four bytes (e.g., bytes numbered "32" to "63") of data to copy to another portion of storage array 208. In this example, second level cache data portion 302 is defined 104 to include the next thirty-two bytes of data (e.g., bytes numbered "32" to "63").

In some implementations, enhancement process 10 instructs 106 the ARM64 processor to retrieve the second level cache data portion before retrieving the first level cache data portion. For example, due to the performance discrepancies between first level cache 212 and second level cache 214, enhancement process 10 instructs 106 ARM64 processor 204 to retrieve second level cache data portion 302 before retrieving first level cache data portion 300. In some implementations, enhancement process 10 instructs 108 the ARM64 processor to retrieve the first level cache data portion. For example and in response to ARM64 retrieving second level cache data portion 302 to second level cache 214, enhancement process 10 instructs 106 ARM64 processor 204 to retrieve first level cache data portion 300.

In some implementations, enhancement process 10 retrieves 110 the second level cache data portion to a Level 2 cache using the ARM64 processor. This is shown in FIG. 3 as actions 1A (i.e., the copying of second level cache data portion 302 to ARM64 processor 204) and 1B (i.e., the caching of second level cache data portion 302 to second level cache 214). In some implementations, enhancement process 10 retrieves 112 the first level cache data portion to a Level 1 cache using the ARM64 processor in response to retrieving the second level cache data portion to the Level 2 cache. This is shown in FIG. 3 as actions 2A (i.e., the copying of first level cache data portion 300 to ARM64 processor 204) and 2B (i.e., the caching of first level cache data portion 300 to first level cache 212). In some implementations, enhancement process 10 continuously prefetches data to second level cache 214 (e.g., Level 2 cache) and fetches data to first level cache 212 (e.g., Level 1 cache) until all of the data of request 210 is processed by ARM64 processor 204. As discussed above, second level cache data portion 302 is defined as the portion of data to be processed that can be fetched to second level cache 214 before first level cache data portion 300 is finished processing by ARM64 processor 204.

In some implementations, the above-described process for "prefetching" data to a second level cache can be applied to two-stage instructions. For example, a two-stage lookup instruction is an instruction that includes an intermediary address with intermediary data (i.e., the data at the intermediary address) that, when obtained, is used to determine the address for the target or destination data. In some implementations, ARM64 processors do not intuitively prefetch the data from the destination address by first calculating the intermediary address and using the intermediary address to calculate the destination address. Rather, conventional approaches with ARM64 processors determine the intermediary address to obtain the intermediary data but do not prefect the data from the destination address. Without the destination address determined in advance (e.g., by prefetching), the ARM64 processor may have to recalculate the destination address later during execution of the request which may result in performance issues within the software application.

Figure 4:
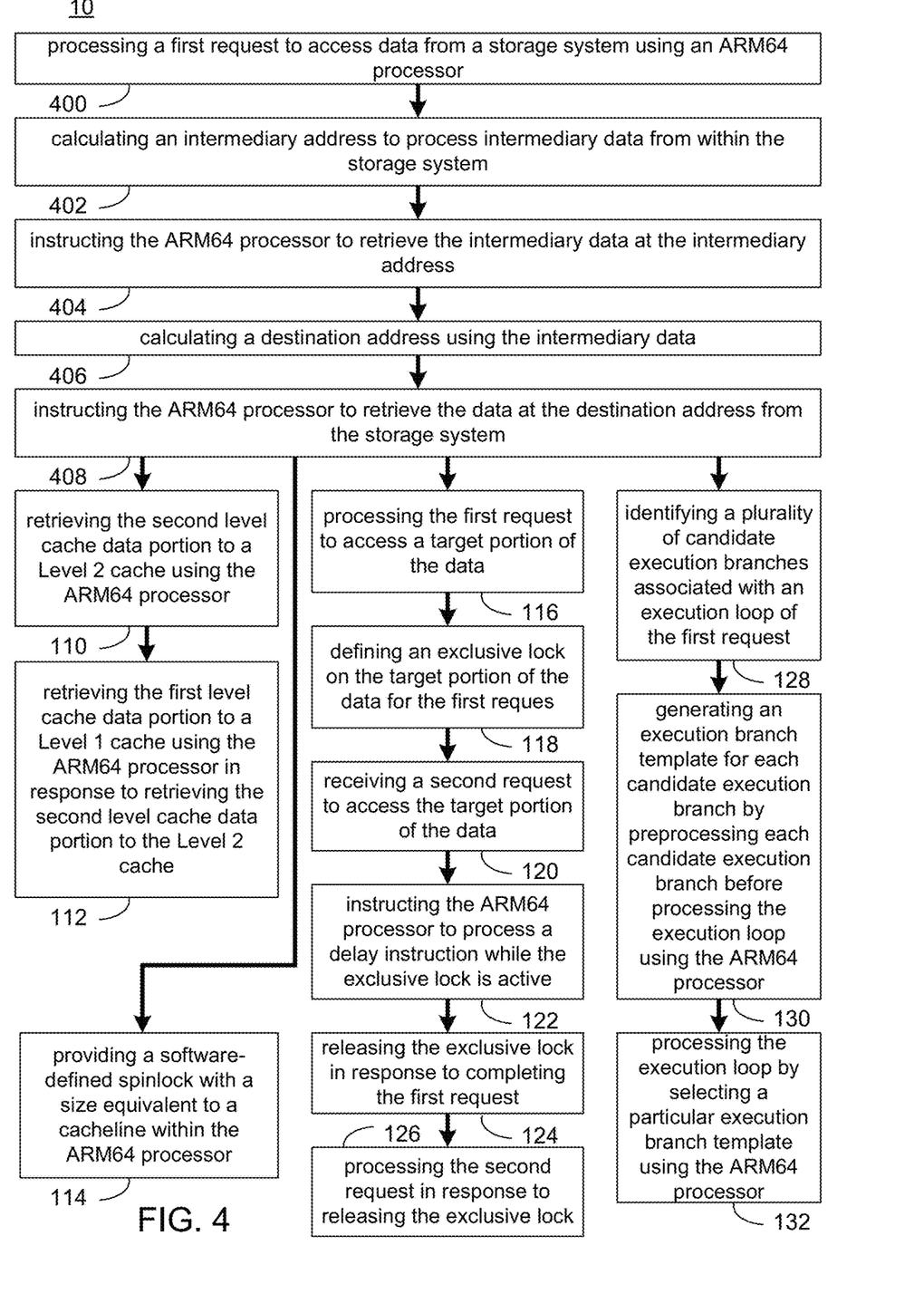
FIG. 4 is a flow chart of one implementation of an enhancement process.

In some implementations and referring also to FIG. 4, enhancement process 10 processes 400 a first request to access data from a storage system using an ARM64 processor. For example, when processing request 210, enhancement process 10 determines that request 210 includes a two-stage lookup instruction (i.e., an instruction with an intermediary address with intermediary data that, when obtained, is used to determine the target data address). In one example, enhancement process 10 processes metadata associated with request 210 to determine that request 210 is a two-stage lookup instruction. In another example, request 210 includes an indication that it is a two-stage lookup instruction.

In some implementations, enhancement process 10 calculates 402 an intermediary address to process intermediary data from within the storage system. For example, suppose request 210 includes a reference to data portion 300 from storage array 208 as the first stage of the two-stage lookup instruction. In this example, enhancement process 10 calculates or determines the intermediary address for data portion 300 within storage array 208 and instructs 404 the ARM64 processor to retrieve the intermediary data at the intermediary address. Referring again to FIG. 3, ARM64 retrieves intermediary data (e.g., data portion 300) from storage array 208 (e.g., action 2A) and stores it in first level cache 212 (e.g., action 2B).

In some implementations, enhancement process 10 calculates 406 a destination address using the intermediary data. For example, suppose enhancement process 10 calculates 406 a destination address for target data (e.g., data portion 302) using the intermediary data (e.g., data portion 300). In this example, enhancement process 10 calculates or determines the destination address for data portion 302 within storage array 208 and instructs 408 the ARM64 processor to retrieve the data at the destination address from within the storage system. Referring again to FIG. 3, ARM64 retrieves destination data (e.g., data portion 302) from storage array 208 (e.g., action 1A) and stores it in second level cache 214 (e.g., action 1). In this manner, enhancement process 10 allows ARM64 processor 204 to respond to two-stage lookup requests in a similar way as an AMD64 processor.

In some implementations, locking mechanisms (e.g., spinlocks) within the ARM64 processor architecture typically use an optimistic acquiring mechanism that locks a certain amount of data (e.g., eight bytes). A cache line in ARM64 is typically a larger amount of data (e.g., sixty-four bytes) than the spinlock allows. However, when a spinlock locks a subset of a cache line (e.g., a particular eight-byte portion of a sixty-four-byte cache line), a request to access the other non-locked portions of data (i.e., data not subject to spinlock) fails the spinlock operation. Accordingly, request processing suffers from significant performance degradation when failing a spinlock operation and resolving the request for non-locked portions of data. In some implementations, enhancement process 10 provides 114 a software-defined spinlock with a size equivalent to a cache line within the ARM64 processor.

Figure 5:
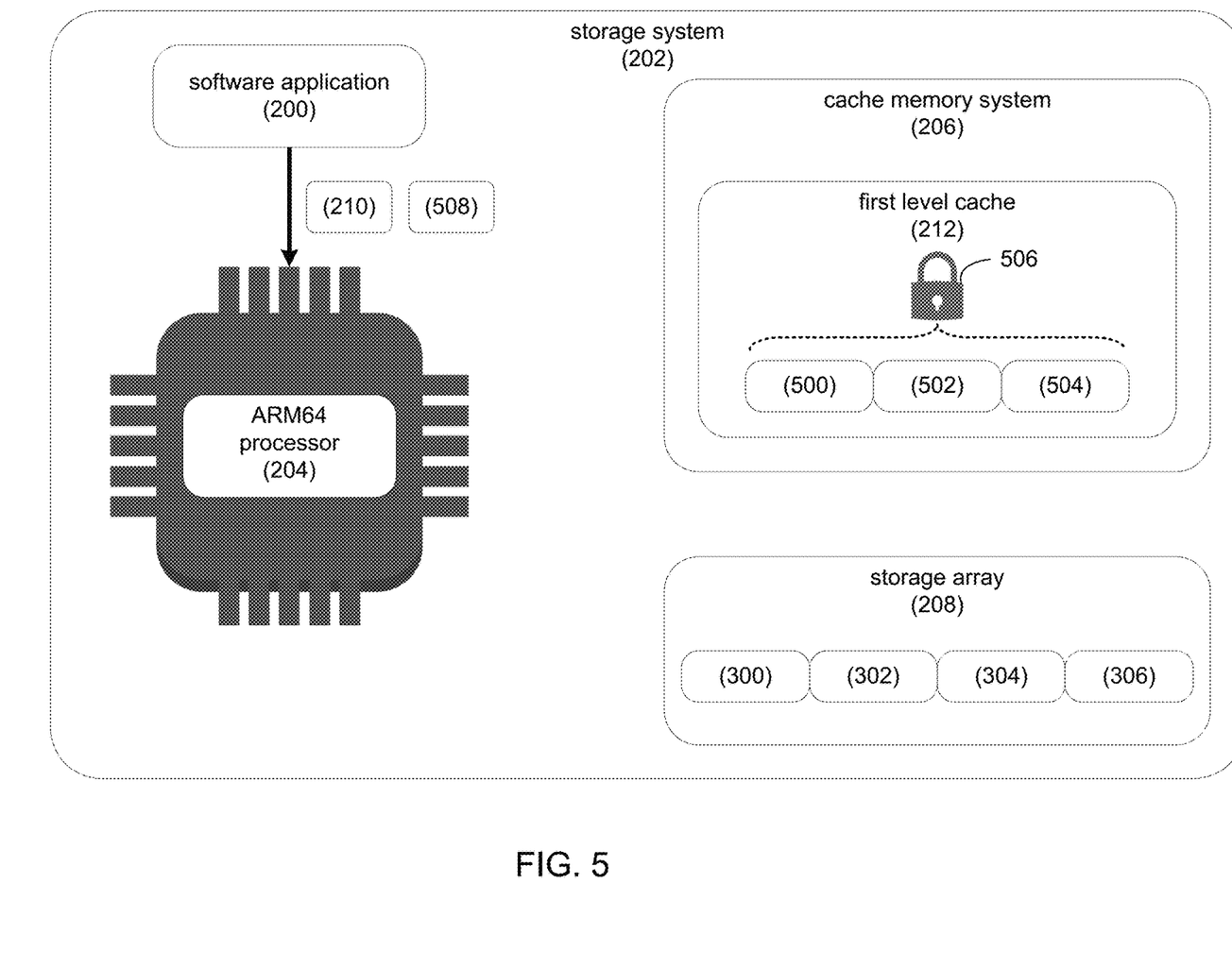
FIG. 5 is a diagrammatic view of the enhancement process locking data portions.

For example, a spinlock is a lock that causes a subsequent thread or processing portion of the ARM64 processor trying to acquire a lock on certain data to simply wait in a loop ("spin") while repeatedly checking whether the lock is available. Referring also to FIG. 5, suppose a first request (e.g., request 210) concerns processing data portions 500, 502, 504 in first level cache 212 of cache memory system 206. As such, enhancement process 10 provides a software-defined spinlock (e.g., software-defined spinlock 506) on data portions 500, 502, 504 such that a second request (e.g., request 508) is unable to obtain data portions 500, 502, 504 until software-defined spinlock 506 is released. In some implementations, software-defined spinlock 506 is a spinlock with a size defined by software application 200. In this example, software-defined spinlock 506 has a size equivalent to the cache line of ARM64 processor 204. A cache line is the smallest unit of storage in cache memory system 206. In one example, the cache line of ARM64 processor 204 is sixty-four bytes in size.

In some implementations, software-defined spinlock 506 is defined independently of any default spinlock size within ARM64 processor 204. For example, software application 200 provides a size for software-defined spinlock 506 without interfering with spinlocks used for other software applications or for spinlocks used by ARM64 processor 204 generally.

In some implementations, by providing 114 software-defined spinlock 506 with a size equivalent to a cache line within ARM64 processor 204, enhancement process 10 is able to enhance the processing efficiency of ARM64 processor 204 by avoiding issues where subsequent requests attempt to access data portions within the same cache line as data under a spinlock but that are not under the spinlock. For example, with software-defined spinlock 506 having the same size as the cache line of ARM64 processor 204, the entire cache line of data is protected by software-defined spinlock 506 from request 508 disruptively attempting to access data not protected by a spinlock but that is within the same cache line as protected data.

In some implementations, when processing requests for data subject to a lock (e.g., within a spinlock), conventional approaches to pausing or delaying the requests are limited to continuous and performance degrading spinlock status checking. For example, suppose a portion of data is locked using a spinlock for processing a first request. A second request for the same portion of data is paused until the spinlock is released. However, with the ARM64 architecture, the ARM64 processor will continuously poll for the spinlock status. As this approach wastes limited processing resources, the performance of the ARM64 processor is reduced.

For example, conventional approaches to delaying ARM64 processor threads or requests involve default "yield" operations in the ARM64 architecture. However, when used to delay a subsequent thread, the ARM64 processor will often treat these yield operations as "no operation" and skip the processing of yield operations which results in inoperative threads and unresolved requests. As will be discussed in greater detail below, enhancement process 10 resolves this challenge by using delay instructions in the form of instruction synchronization barrier (ISB) instructions.

Figure 6:
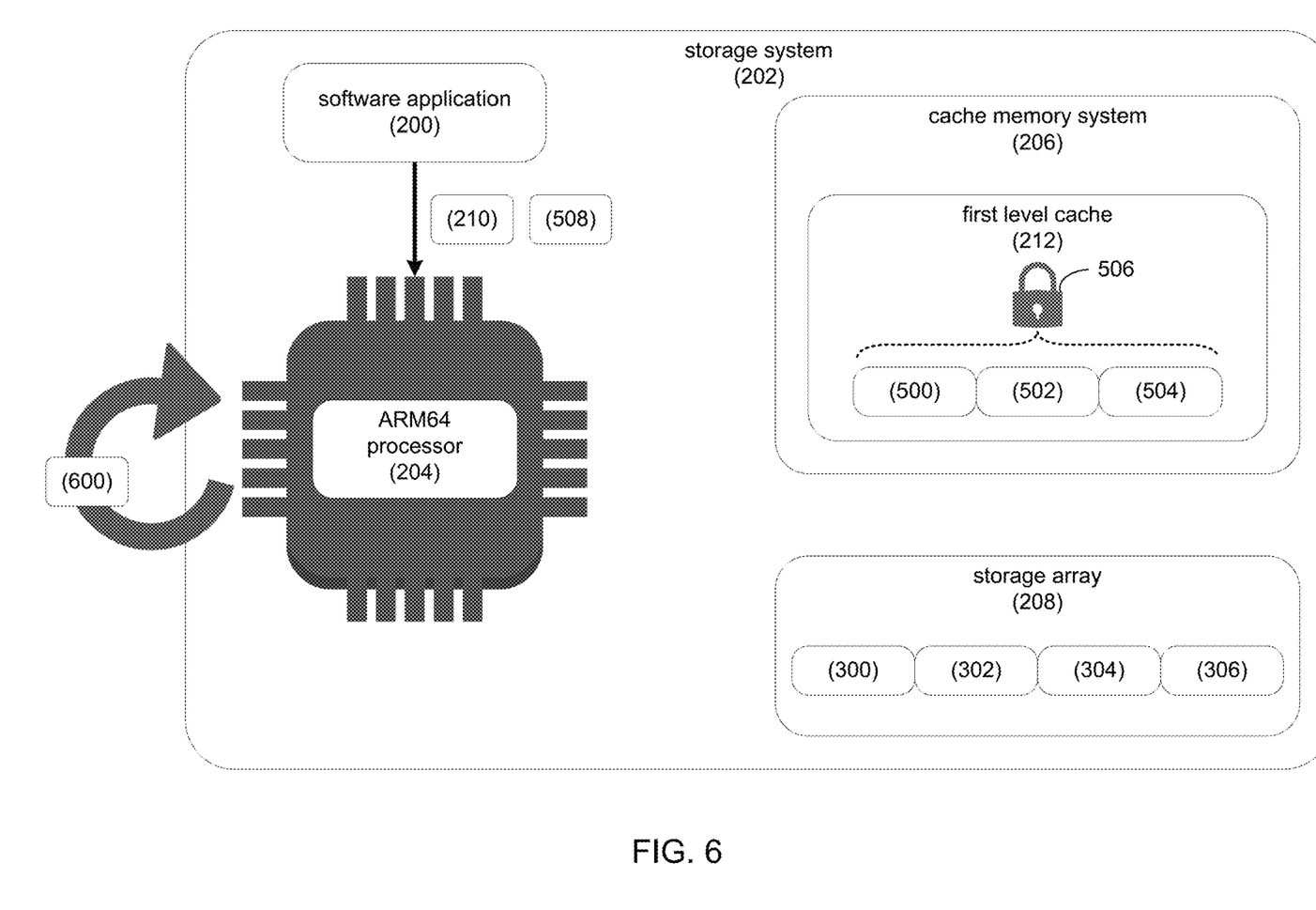
FIG. 6 is a diagrammatic view of the enhancement process processing an Instruction Synchronization Barrier (ISB) instruction.

In some implementations and referring also to FIG. 6, enhancement process 10 processes 116 the first request to access a target portion of the data. Continuing with the above example, suppose a first request (e.g., request 210) concerns processing data portions 500, 502, 504 in first level cache 212 of cache memory system 206. In some implementations, enhancement process 10 defines 118 an exclusive lock on the target portion of the data for the first request. For example, enhancement process 10 provides a spinlock (e.g., spinlock 506) on data portions 500, 502, 504 such that a second request (e.g., request 508) is unable to obtain data portions 500, 502, 504 until spinlock 506 is released. Now suppose that enhancement process 10 receives 120 a second request to access the target portion of the data (e.g., data portion 502). In this example, ARM64 processor 204 provides default instructions to poll whether or not spinlock 506 is still active. As discussed above and in some implementations, this is defined as a "yield" operation/instruction. The challenge with the "yield" instruction in the ARM64 architecture is that the processor may begin to ignore these commands which results in rejected or failed requests for locked data.

In some implementations, enhancement process 10 instructs 122 the ARM64 processor to process an Instruction Synchronization Barrier (ISB) instruction while the exclusive lock is active. An Instruction Synchronization Barrier (ISB) instruction/operation is an instruction that ensures that all instructions preceding the ISB in program or execution order are completed before any instruction following the barrier instruction begins execution. Referring again to FIG. 6, enhancement process 10 instructs 122 ARM64 processor 204 to process an ISB instruction (e.g., ISB instruction 600) while the exclusive lock (e.g., spinlock 506) is active.

In some implementations, instructing 122 the ARM64 processor to process the ISB instruction includes iteratively instructing the ARM64 processor to process additional ISB instructions, where the number of ISB instructions to process each time increases with each iteration. For example, suppose enhancement process 10 instructs 122 ARM64 processor to process ISB instruction 600. Now suppose that after processing ISB instruction 600, spinlock 506 is still active on data portion 502. In this example, enhancement process 10 increases the number of ISB instructions for ARM64 processor 204 to process from one to two. Suppose that after processing the two ISB instructions, spinlock 506 is still active on data portion 502. In this example, enhancement process 10 increases the number of ISB instructions for ARM64 processor 204 to process again from two to three. In another example, enhancement process 10 increases the number of ISB instructions exponentially. In another example, enhancement process 10 increases the number of ISB instructions by a predefined factor (e.g., a factor of ten). In this manner, it will be appreciated that enhancement process 10 iteratively instructs 122 ARM64 processor 204 to process increasing numbers of ISB instructions to back ARM64 processor 204 off from executing request 508 on data portion 502.

In some implementations, enhancement process 10 releases 124 the exclusive lock in response to completing the first request. Referring again to the example of FIG. 6, with spinlock 506 released on data portions 500, 502, 504, enhancement process 10 processes 126 the second request (e.g., request 508) in response to releasing the exclusive lock.

In some implementations when addressing candidate branches in the execution of a request, ARM64 processors experience higher branch prediction miss rates compared to AMD64 processors. For example, when processing the candidate branches during each iteration or "loop" of the request, ARM64 processors have reduced performance characteristics for predicting the likely candidate branch compared to AMD64 processors resulting in performance degradation for software applications using the ARM64 processor to process candidate branches in the execution of requests. In some implementations, enhancement process 10 uses registers of the ARM64 processor to process all candidate branches at compile time to reduce branch prediction misses. In this manner, as opposed to attempting to predict which branch will be selected during execution and processing the predicted candidate branch code, enhancement process 10 uses pre-processed candidate branch code as a template that is selected during execution.

Figure 7:
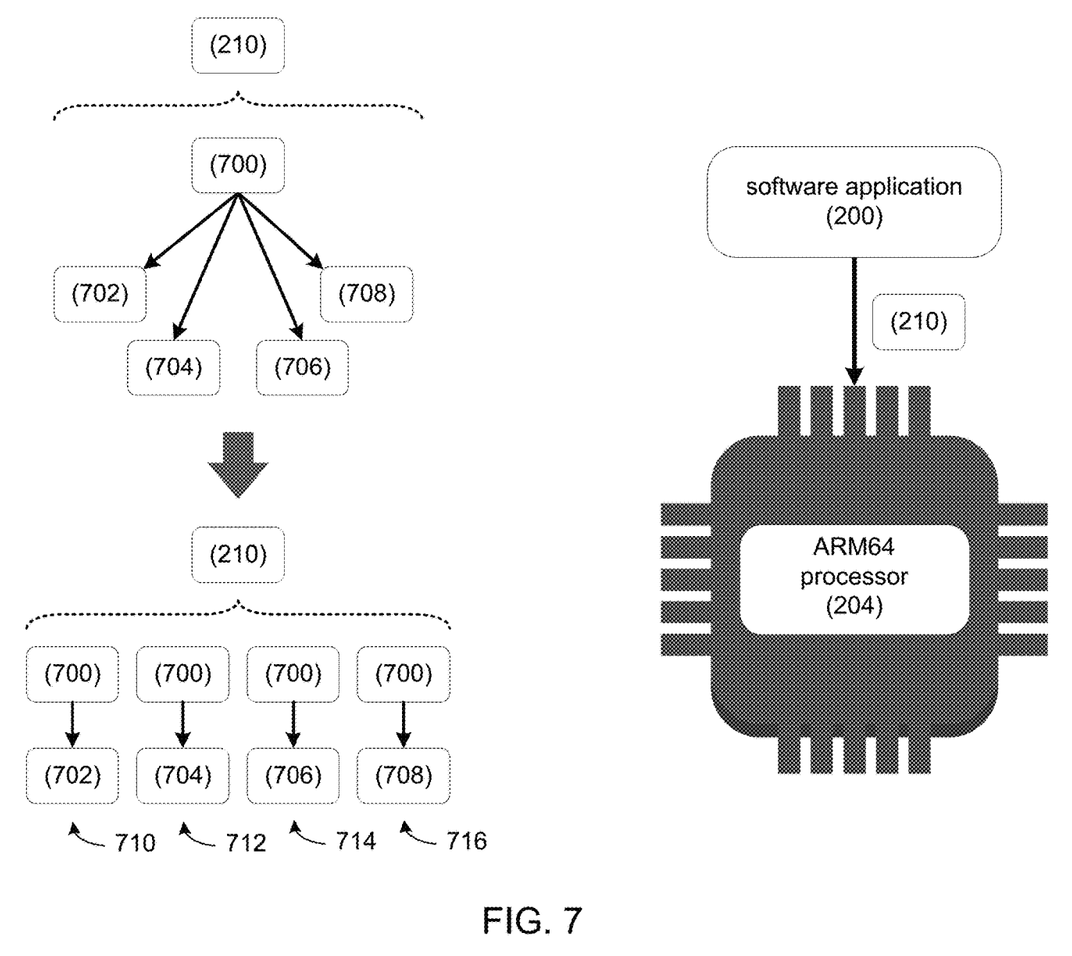
FIG. 7 is a diagrammatic view of the enhancement process generating execution branch templates.

In some implementations, enhancement process 10 identifies 128 a plurality of candidate execution branches associated with an execution loop of the first request. Referring also to FIG. 7, suppose request 210 includes an execution loop (e.g., execution loop 700) in its code that includes a plurality of candidate execution branches (e.g., candidate execution branches 702, 704, 706, 708). In this example, when entering execution loop 700, the next instruction or step in the processing of request 210 is one of candidate execution branches 702, 704, 706, 708). As shown in FIG. 7, enhancement process 10 identifies 128 each candidate execution branch (e.g., candidate execution branch 702, 704, 706, 708) from execution loop 700 of request 210.

In some implementations, enhancement process 10 generates 130 an execution branch template for each candidate execution branch by preprocessing each candidate execution branch before processing the execution loop using the ARM64 processor. For example, using one or more registers within ARM64 processor 204, enhancement process 10 generates 130, at compile time, an execution branch template for each candidate execution branch (e.g., execution branch template 710 for candidate execution branch 702; execution branch template 712 for candidate execution branch 704; execution branch template 712 for candidate execution branch 706; and execution branch template 714 for candidate execution branch 708). An execution branch template is a preprocessed/precompiled portion of execution loop 700 for one of the candidate execution branches. For example, execution branch template 712 is generated 130 for candidate execution branch 704 representing satisfaction of the conditions associated with candidate execution branch 704.

In this manner, by pre-generating (i.e., generating at compile time before processing the execution loop at runtime) execution branch templates 710, 712, 714, 716, enhancement process 10 is able to avoid the processing penalty associated with ARM64 processor 204 predicting the wrong candidate execution branch. Rather, at runtime, enhancement process 10 processes 132 the execution loop by selecting a particular execution branch template using the ARM64 processor. For example, when processing execution loop 700, enhancement process 10 determines, at runtime, which execution branch template (e.g., execution branch templates 710, 712, 714, 716) to enhancement process 10.

Figure 8:
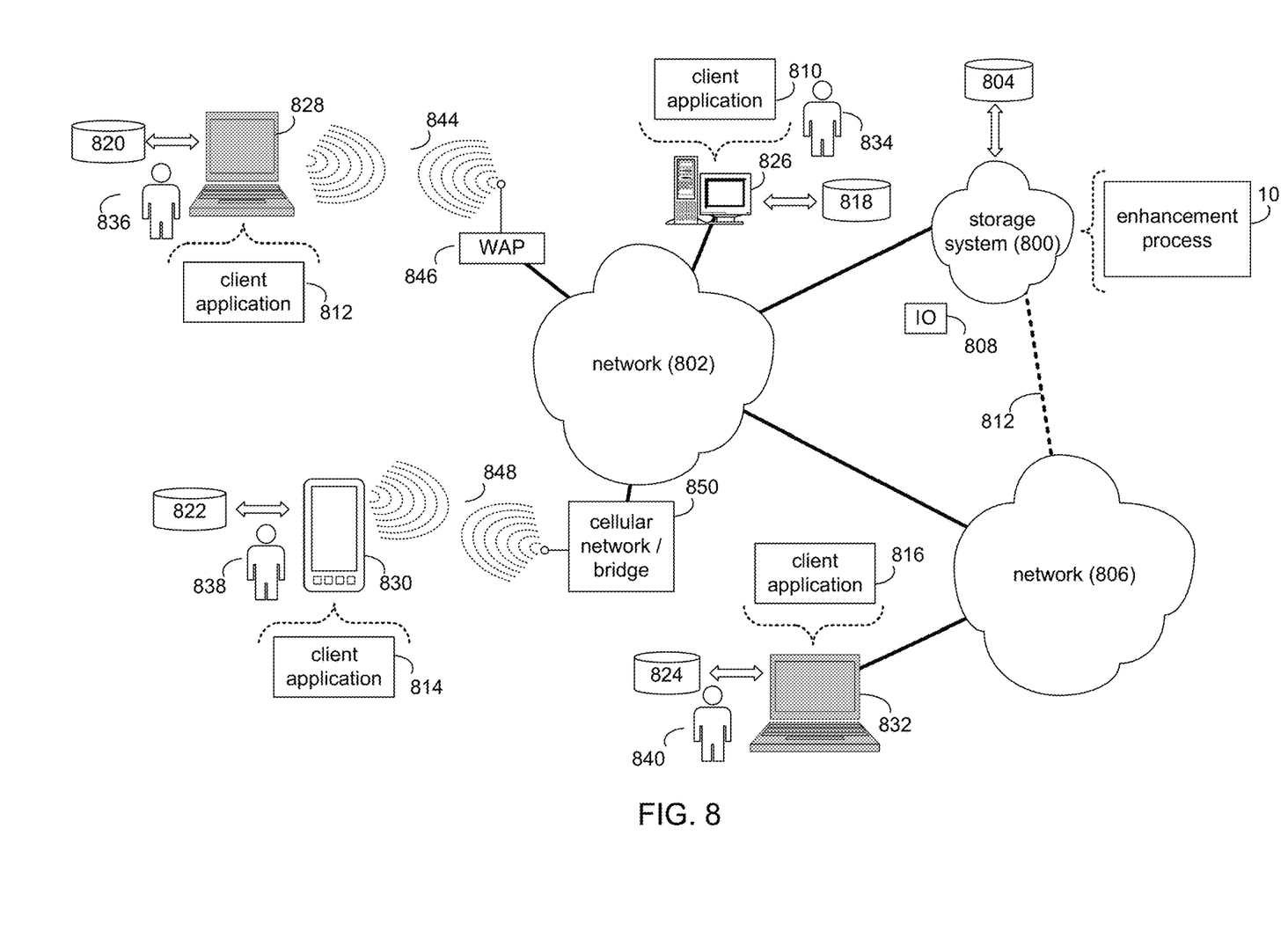
FIG. 8 is a diagrammatic view of computer system and the enhancement process coupled to a distributed computing network.

System Overview:

Referring to FIG. 8, an enhancement process 10 is shown to reside on and is executed by storage system 800, which is connected to network 802 (e.g., the Internet or a local area network). Examples of storage system 800 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 800 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of enhancement process 10, which are stored on storage device 804 included within storage system 800, are executed by one or more processors (not shown) and one or more memory architectures (not shown) included within storage system 800. Storage device 804 may include: a hard disk drive; an optical drive; a RAID device; a random-access memory (RAM); a read-only memory (ROM); and all forms of flash memory storage devices. Additionally or alternatively, some portions of the instruction sets and subroutines of enhancement process 10 are stored on storage devices (and/or executed by processors and memory architectures) that are external to storage system 800.

In some implementations, network 802 is connected to one or more secondary networks (e.g., network 806), examples of which include: a local area network; a wide area network; or an intranet.

Various input/output (IO) requests (e.g., IO request 808) are sent from client applications 810, 812, 814, 816 to storage system 800. Examples of IO request 808 include data write requests (e.g., a request that content be written to storage system 800) and data read requests (e.g., a request that content be read from storage system 800).

The instruction sets and subroutines of client applications 810, 812, 814, 816, which may be stored on storage devices 818, 820, 822, 824 (respectively) coupled to client electronic devices 826, 828, 830, 832 (respectively), may be executed by one or more processors (not shown) and one or more memory architectures (not shown) incorporated into client electronic devices 826, 828, 830, 832 (respectively). Storage devices 818, 820, 822, 824 may include: hard disk drives; tape drives; optical drives; RAID devices; random access memories (RAM); read-only memories (ROM), and all forms of flash memory storage devices. Examples of client electronic devices 826, 828, 830, 832 include personal computer 826, laptop computer 828, smartphone 830, laptop computer 832, a server (not shown), a data-enabled, and a dedicated network device (not shown). Client electronic devices 826, 828, 830, 832 each execute an operating system.

Users 834, 836, 838, 840 may access storage system 800 directly through network 802 or through secondary network 806. Further, storage system 800 may be connected to network 802 through secondary network 806, as illustrated with link line 842.

The various client electronic devices may be directly or indirectly coupled to network 802 (or network 806). For example, personal computer 826 is shown directly coupled to network 802 via a hardwired network connection. Further, laptop computer 832 is shown directly coupled to network 806 via a hardwired network connection. Laptop computer 828 is shown wirelessly coupled to network 802 via wireless communication channel 844 established between laptop computer 828 and wireless access point (e.g., WAP) 846, which is shown directly coupled to network 802. WAP 846 may be, for example, an IEEE 802.11a, 802.11b, 802.11g, 802.11n, Wi-Fi®, and/or Bluetooth® device that is capable of establishing a wireless communication channel 844 between laptop computer 828 and WAP 846. Smartphone 830 is shown wirelessly coupled to network 802 via wireless communication channel 848 established between smartphone 830 and cellular network/bridge 850, which is shown directly coupled to network 802.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   processing a first request to access data stored at a storage array using an ARM64 processor;
   defining a first level cache data portion of the data by calculating a portion of the data to retrieve from the storage array and to store in a first level cache within a cache memory system;
   defining a second level cache data portion of the data by calculating a portion of data to retrieve from the storage array and to store in a second level cache within the cache memory system;
   instructing the ARM64 processor to retrieve the second level cache data portion from the storage array and to store the second level cache data portion of the data in the second level cache before retrieving the first level cache data portion of the data from the storage array; and
   instructing the ARM64 processor to retrieve the first level cache data portion of the data from the storage array and to store the first level cache data portion of the data in the first level cache.

2. The computer-implemented method of claim 1, further comprising:
   retrieving the second level cache data portion to a Level 2 cache using the ARM64 processor.

3. The computer-implemented method of claim 2, further comprising: retrieving the first level cache data portion to a Level 1 cache using the ARM64 processor in response to retrieving the second level cache data portion to the Level 2 cache.

4. The computer-implemented method of claim 1, further comprising: providing a software-defined spinlock with a size equivalent to a cache line within the ARM64 processor.

5. The computer-implemented method of claim 1, further comprising:
   processing the first request to access a target portion of the data;
   defining an exclusive lock on the target portion of the data for the first request;
   receiving a second request to access the target portion of the data;
   instructing the ARM64 processor to process an Instruction Synchronization Barrier (ISB) instruction while the exclusive lock is active;
   releasing the exclusive lock in response to completing the first request; and
   processing the second request in response to releasing the exclusive lock.

6. The computer-implemented method of claim 5, wherein instructing the ARM64 processor to process the ISB instruction includes iteratively instructing the ARM64 processor to process additional ISB instructions, wherein the number of ISB instructions to process each time increases with each iteration.

7. The computer-implemented method of claim 1, wherein processing the first request includes:
   identifying a plurality of candidate execution branches associated with an execution loop of the first request;
   generating an execution branch template for each candidate execution branch by preprocessing each candidate execution branch before processing the execution loop using the ARM64 processor; and processing the execution loop by selecting a particular execution branch template using the ARM64 processor.

8. A system comprising:

a memory; and a processor operatively coupled to the memory, configured to:

process a first request to access data stored at a storage array using an ARM64 processor;

define a first level cache data portion of the data by calculating a portion of the data to retrieve from the storage array and to store in a first level cache within a cache memory system;

defining a second level cache data portion of the data by calculating a portion of data to retrieve from the storage array and to store in a second level cache within the cache memory system;

instruct the ARM64 processor to retrieve the second level cache data portion from the storage array and to store the second level cache data portion of the data in the second level cache before retrieving the first level cache data portion of the data from the storage array; and instruct the ARM64 processor to retrieve the first level cache data portion of the data from the storage array and to store the first level cache data portion of the data in the first level cache.

9. The system of claim 8, wherein the processor is further configured to:

retrieve the second level cache data portion to a Level 2 cache using the ARM64 processor.

10. The system of claim 9, wherein the processor is further configured to:

retrieve the first level cache data portion to a Level 1 cache using the ARM64 processor in response to retrieving the second level cache data portion to the Level 2 cache.

11. The system of claim 8, wherein the processor is further configured to:

provide a software-defined spinlock with a size equivalent to a cache line within the ARM64 processor.

12. The system of claim 8, wherein the processor is further configured to:

process the first request to access a target portion of the data;

defining an exclusive lock on the target portion of the data for the first request;

receive a second request to access the target portion of the data;

instruct the ARM64 processor to process an Instruction Synchronization Barrier (ISB) instruction while the exclusive lock is active;

release the exclusive lock in response to completing the first request; and process the second request in response to releasing the exclusive lock.

13. The system of claim 12, wherein to instruct the ARM64 processor to process the ISB instruction, the processor is configured to iteratively instruct the ARM64 processor to process additional ISB instructions, wherein the number of ISB instructions to process each time increases with each iteration.

14. The system of claim 8, wherein to process the first request, the processor is configured to:

identify a plurality of candidate execution branches associated with an execution loop of the first request;

generate an execution branch template for each candidate execution branch by preprocessing each candidate execution branch before processing the execution loop using the ARM64 processor; and process the execution loop by selecting a particular execution branch template using the ARM64 processor.

15. A non-transitory computer readable medium having instructions stored thereon that, when executed by a processor, cause the processor to:

process a first request to access data stored at a storage array using an ARM64 processor;

define a first level cache data portion of the data by calculating a portion of the data to retrieve from the storage array and to store in a first level cache within a cache memory system;

defining a second level cache data portion of the data by calculating a portion of data to retrieve from the storage array and to store in a second level cache within the cache memory system;

instruct the ARM64 processor to retrieve the second level cache data portion from the storage array and to store the second level cache data portion of the data in the second level cache before retrieving the first level cache data portion of the data from the storage array; and instruct the ARM64 processor to retrieve the first level cache data portion of the data from the storage array and to store the first level cache data portion of the data in the first level cache.

16. The non-transitory computer readable medium of claim 15, wherein the processor is further configured to:

retrieve the second level cache data portion to a Level 2 cache using the ARM64 processor.

17. The non-transitory computer readable medium of claim 16, wherein the processor is further configured to:

retrieve the first level cache data portion to a Level 1 cache using the ARM64 processor in response to retrieving the second level cache data portion to the Level 2 cache.

18. The non-transitory computer readable medium of claim 15, wherein the processor is further configured to:

provide a software-defined spinlock with a size equivalent to a cache line within the ARM64 processor.

19. The non-transitory computer readable medium of claim 15, wherein the processor is further configured to:

process the first request to access a target portion of the data;

defining an exclusive lock on the target portion of the data for the first request;

receive a second request to access the target portion of the data;

instruct the ARM64 processor to process an Instruction Synchronization Barrier (ISB) instruction while the exclusive lock is active;

release the exclusive lock in response to completing the first request; and process the second request in response to releasing the exclusive lock.

20. The non-transitory computer readable medium of claim 19, wherein to instruct the ARM64 processor to process the ISB instruction, the processor is configured to iteratively instruct the ARM64 processor to process additional ISB instructions, wherein the number of ISB instructions to process each time increases with each iteration.

* * * * *